United States Patent [19]

Matz et al.

[11] Patent Number: 4,763,932
[45] Date of Patent: Aug. 16, 1988

[54] HOSE COUPLING

[76] Inventors: Edward I. Matz, P.O. Box 5337, Daytona Beach, Fla. 32018; Robert A. Costa, 4430 N. U.S. Highway 17, DeLand, Fla. 32720

[21] Appl. No.: 78,463

[22] Filed: Jul. 27, 1987

[51] Int. Cl.⁴ .............................................. F16L 33/08
[52] U.S. Cl. .................... 285/177; 285/253; 285/331; 285/903
[58] Field of Search ............... 285/253, 903, 331, 236, 285/252, 177

[56] References Cited

U.S. PATENT DOCUMENTS

| | | | |
|---|---|---|---|
| 454,648 | 6/1891 | Hallas | 285/251 |
| 2,165,926 | 7/1939 | Greene | 285/177 X |
| 3,239,254 | 3/1966 | Campbell | 285/903 X |
| 3,408,091 | 10/1968 | Zylstra | 285/253 X |
| 3,493,251 | 2/1970 | Kramer | 285/331 X |
| 3,840,256 | 10/1974 | Cox, Jr. | 285/331 X |
| 4,191,407 | 3/1980 | Bretone, Jr. | 285/177 X |
| 4,480,860 | 11/1984 | Foresta et al. | 285/236 X |
| 4,625,998 | 12/1986 | Draudt et al. | 285/331 X |

Primary Examiner—Thomas F. Callaghan
Attorney, Agent, or Firm—William M. Hobby

[57] ABSTRACT

A flexible corrugated hose coupling apparatus is provided for coupling a corrugated hose to a cylindrical neck or sleeve. A resilient hollow cylindrical coupling member has two ends and a generally smooth interior and exterior cylindrical surface and has an annular coaxial bore extending into one end thereof and shaped for threadedly receiving a corrugated hose of a predetermined size to allow the flexible coupling member to be threaded onto the end of a flexible corrugated hose. A clamp can be extended around the resilient hollow cylindrical coupling member for clamping the coupling member and the hose threaded thereinto a coupling neck, such as the neck from a vehicle radiator, so that a flexible corrugated hose can be cut to any length and attach to a smooth or rigid neck with a clamp to achieve a fluid type seal between the corrugated hose and neck.

4 Claims, 1 Drawing Sheet

U.S. Patent      Aug. 16, 1988      4,763,932
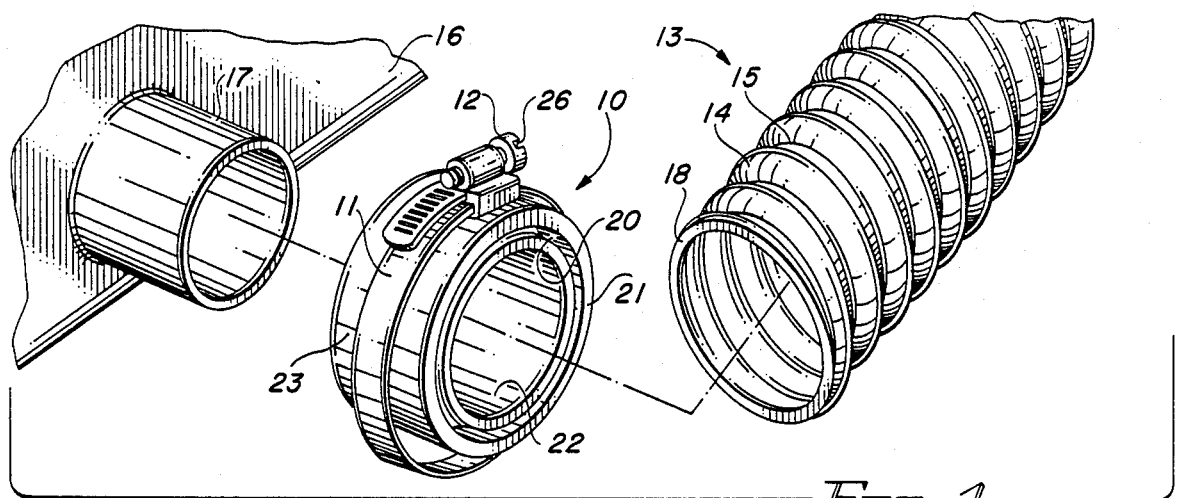
FIG. 1
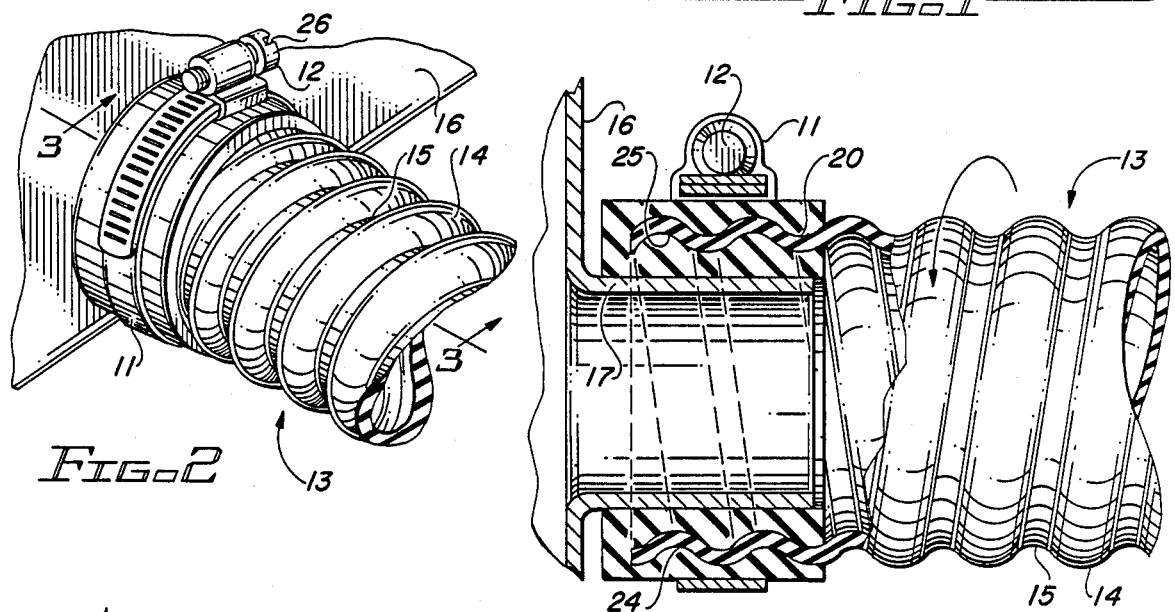
FIG. 2
FIG. 3
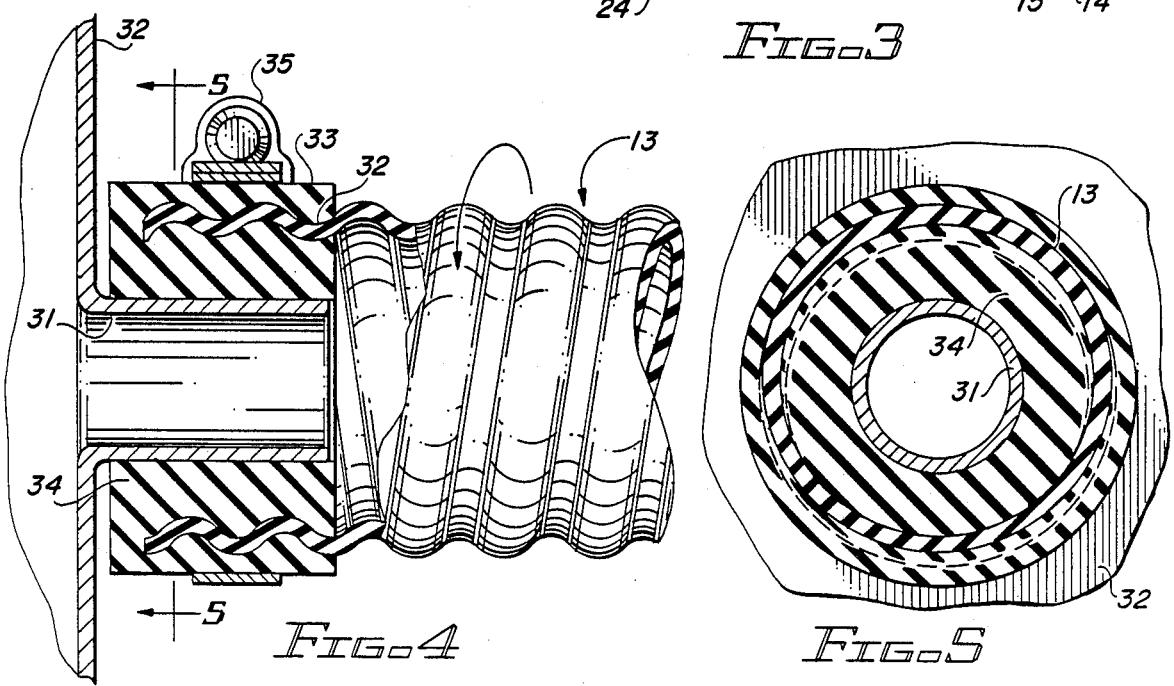
FIG. 4
FIG. 5

HOSE COUPLING

BACKGROUND OF THE INVENTION

The present invention relates to a flexible corrugated hose coupling for coupling a corrugated hose to a cylindrical neck or sleeve.

Flexible rubber or polymer corrugated hoses have been commonly used in connection with vehicles, engines or anywhere a swivel or bending is required in certain type of hoses. These hoses may be of rubber or rubberlike synthetic materials and they may have a reinforced coiled wire either formed in the hose or inside the hose. Because the corrugation has spiraling ridges and grooves thereon, most corrugated hoses have been formed to a specific length for a specific vehicle connection and have smooth cylindarical ends on each end thereof for sliding onto the neck of a radiator or engine inlet or outlet. The ends can then be clamped to the neck protruding from the radiator or from the engine. Corrugated flexible hoses have not been utilized more often, because they need had to be made a specific length, having a smooth cylindrical end in order to couple the hose to the engine, radiator or similar connection. This requires a wide variety of length and sizes to cover the many different types of connections. To avoid this problem smooth cylindrical hoses having reinforced rubber or polymer materials, are utilized but these generally cannot be bent to a great degree without collapsing the tubing. A similar problem has been encountered in connection with rigid corrugated pipe, which is commonly used in electrical wiring, but which can be more readily bent than a rigid pipe. The connection typically does not require a waterproof seal and can be slid into an electrical box and clamped with a screw for sliding electrical cable through. In contrast thin wall conduit must be bent with special tools such as hickeys.

Typical prior art connectors for swivel or corrugated hoses can be seen in the Draudt, et al., U.S. Pat. No. 4,625,998, for Swivel hose couplings in which the swivel hose is slid into a coupling member and captured on one side with threads or clips. In the Saka U.S. Pat. No. 4,630,850, for a Pipe joint, a corrugated pipe is threaded against the interior corrugation threads of a compression joint. In the U.S. patent to Menges, U.S. Pat. No. 4,423,891, a corrugated hose coupling is shown for locking onto the angular grooves of the pipe, while in the Borsh, et al., U.S. Pat. No. 4,443,031, a connector fitting for connecting corrugated conduit sections is illustrated. In the Pate, et al., U.S. Pat. No. 4,470,622, a flexible conduit pipe connector allows a swinging clamp to swing over a corrugated pipe section and to be clamped thereon, while in a second, Pate, et al., U.S. Pat. No. 4,440,425, a flexible conduit system has a clamp for clamping around pipe for electrical cables. In the Goransson U.S. Pat. No. 3,993,330, a typical rigid corrugated conduit for electrical conductors is shown with a compression holding end coupling. In the Campbell patent, U.S. Pat. No. 3,708,187, a conduit seal is provided for clamping around a conduit pipe, while in the Wright U.S. Pat. No. 4,400,022, a tube connector threads between a smooth outer surface and a corrugated inner surface with a locking spring locking the conduit in place. In the Beckham, et al., U.S. Pat. No. 2,821,768, a clamping band clamps around the corrugation grooves of a corrugated pipe.

In contrast to these prior patent, the present invention is directed to a simple corrugated pipe coupling which can be rapidly threaded onto the end of a flexible resilient corrugated pipe and clamped onto a coupling neck for providing a water tight seal even under high pressure and heat conditions.

SUMMARY OF THE INVENTION

The present invention is for a flexible corrugated hose coupling for a hose to a cylindrical neck. It includes a resilient hollow cylindrical coupling member having two end and a generally smooth interior and exterior cylindrical surface. An annular coaxial bore extending into one end thereof is shaped for threadedly receiving a corrugated hose of a predetermined size, so that the flexible coupling member can be threaded onto the flexible corrugated hose. A clamp extends around the resilient hollow cylindrical coupling member for clamping the coupling member and hose threaded thereinto onto a coupling neck, so that a flexible corrugated hose can be cut to any length and attached to a smooth or rigid neck with a clamp to achieve a fluid tight seal between the corrugated hose and the neck. The resilient hollow cylindrical coupling member annual coaxial bore has internal and external threads therein matching the internal and external corrugations of the flixible corrugated hose coupling. The flexible corrugated hose coupling bore has spiraling ridges on both cylindrical surfaces therein, so that it can readily threaded onto the end of a flexible corrugated hose.

BRIEF DESCRIPTION OF THE INVENTIO

Other objects, features and advantages of the present invention will be apparent from the written description and the drawings in which;

FIG. 1 is an exploded perspective view of the end of a corrugated hose, and a hose coupling member in accordance with the present invention adjacent a radiator neck;

FIG. 2 is a cutaway perspective view of a corrugated hose of FIG. 1 attached to the neck;

FIG. 3 is a sectional view taken on a line 3—3 of FIG. 2;

FIG. 4 is a partial sectional view taken on a line 3—3 of FIG. 2, but with a larger hose attached to a smaller neck; and FIG. 5 is a sectional view taken line 5—5 of FIG. 4.

DESCRIPTION OF THE PREFERRED EMBODIMENT

Referring to FIGS. 1 through 3 of the drawings, a flexible corrugated hose coupling member 10 is shown having a stainless steel clamp 11 clamped thereon with a threaded clamp tighting member 12. A flexible corrugated hose 13 has spiraling or coiled ridges 14 on the exterior thereof spaced by spiraling grooves 15. A vehicle radiator 16 has a conventional hose coupling neck 17 extending therefrom. A fluid tight seal could not normally be obtained with the corrugated hose 13 without a special smooth end extending therefrom, but in this case the hose 13 end portion 18 allows the coupling member 10 to be threaded thereon in an annular coaxial bore 20 extending in one end 21 of the flexible corrugated hose coupling member 10. The coupling member 10 has a cylindrical hollow passageway 22 extending therefrom and a smooth cylindrical exterior wall 23. The annular coaxial bore 20 extending into end 21 of the hose coupling 10 exactly matches the coiled ridges 14 and valleys 15 of the hose 13 and is made of a flexible rubber or any resilient polymer desired. The bore 20 as seen in FIG. 3 has an external wall threaded portion 24 while the interior wall has coiled threaded portions 25 to thereby form a flexible corrugated hose coupling bore with spiraling ridges on both cylindrical surfaces of the bore 21. That is to say, the resilient hollow cylindrical coupling member 10 annular coaxial bore 20 extend axially into the hose coupling as both internal and external threads therein matching the internal and external corrugations of the flexible corrugated hose coupling 13. The member 20 can be threaded onto the tip 18 of the hose 13 and then the coupling slid onto the neck 17 as shown in FIG. 3 and clamped by placing a screwdriver in the slot 26 and rotating it to rotate the threaded members 12 to clamp the clamp onto the resilient member 10 and the resilient hose 13 which when threaded in the coupling 10 act as one smooth end surface clamped down onto the exterior surface of neck 17.

Referring to FIGS. 4 and 5, an alternate embodiment of a flexible corrugated hose coupling 30 is illustrated attached to a smaller neck 31 attached to a radiator housing 32 for attaching the corrugated pipe 13. As seen in this view, the coupling member 30 has been threaded unto the hose 13 but is connected to a smaller neck 31 so that the annular coaxial bore 32 is placed away from the center of the end 33 of the member 30 to allow a greater space 34 between the hose 13 and the neck 31 so that a larger hose can be coupled to a smaller neck and thereby eliminate the need for a large variety of diameter hoses. In this embodiment a stainless steel clamp 35 similar to the clamp 11 is clamped onto the corrugated hose 13 and coupling member 30 which acts as a unit to provide a cylindrical smooth interior and exterior end coupling portion for the corrugated hose 13 coupling member 30 in the same manner as the coupling 10 with internal and external threads matching the internal and exterior corrugated surface of the hose 13. Thus, a repair shop can utilize a roll of flexible corrugated hose 13, which can be but to the length desired and attached to the appropriate coupling member 10 or 30 by threading the coupling on the end of the cut hose. The coupling can then be slid onto the neck 17 or 31 and clamped with a clamp 11 or 35 to give a fluid tight seal to the end of the corrugated hose. Clamping of the clamps 11 and 35 advantageously treats entire resilient coupling member 10 and 30 with resilient hose threaded therein as a single unit and compresses the coupling onto the hose 13 and onto neck 17 or 31 simultaneously to seal against leaks around the coupling over the neck 17 or 31, as well as around the corrugated hose end 18. It should, however, also be clear that the present invention is not to be construed as limited to the forms shown which are to be considered illustrative rather than restrictive.

I claim:

1. A flexible corrugated hose coupling for coupling a hose to a cylindrical neck comprising:

a resilient hollow cylindrical coupling member having two ends and a center bore therethrough and having an annular coaxial bore extending into one end thereof and shaped for threadedly receiving a corrugated hose of a predetermined size, said resilient hollow cylindrical coupling member annular coaxial bore extending into one end thereof and having internal and external threads therein matching the internal and external corrugations of a flexible corrugated hose coupling whereby said flexible coupling member can be threaded onto said flexible corrugated hose;

means to allow said resilient hollow cylindrical coupling member to have different size center bores for one corrugated hose of predetermined size whereby one size corrugated hose can be fitted to different size cylindrical necks; and clamping means extending around said resilient hollow cylindrical coupling member for clamping said coupling member and hose threaded thereinto onto a coupling neck whereby flexible corrugated hose can be cut to any length and attached to a smooth or ridged neck with a clamp to achieve a fluid tight seal between the corrugated hose and neck.

2. A flexible corrugated hose coupling in accordance with claim 1 in which said resilient hollow cylindrical coupling member is made of a resilient rubber compound.

3. A flexible corrugated hose coupling in accordance with claim 1 in which said clamp is a steel band clamp.

4. A flexible corrugated hose coupling in accordance with claim 1 in which said flexible corrugated hose coupling bore has spiraling ridges on both cylindrical surfaces thereof.

* * * * *